Figure 1:
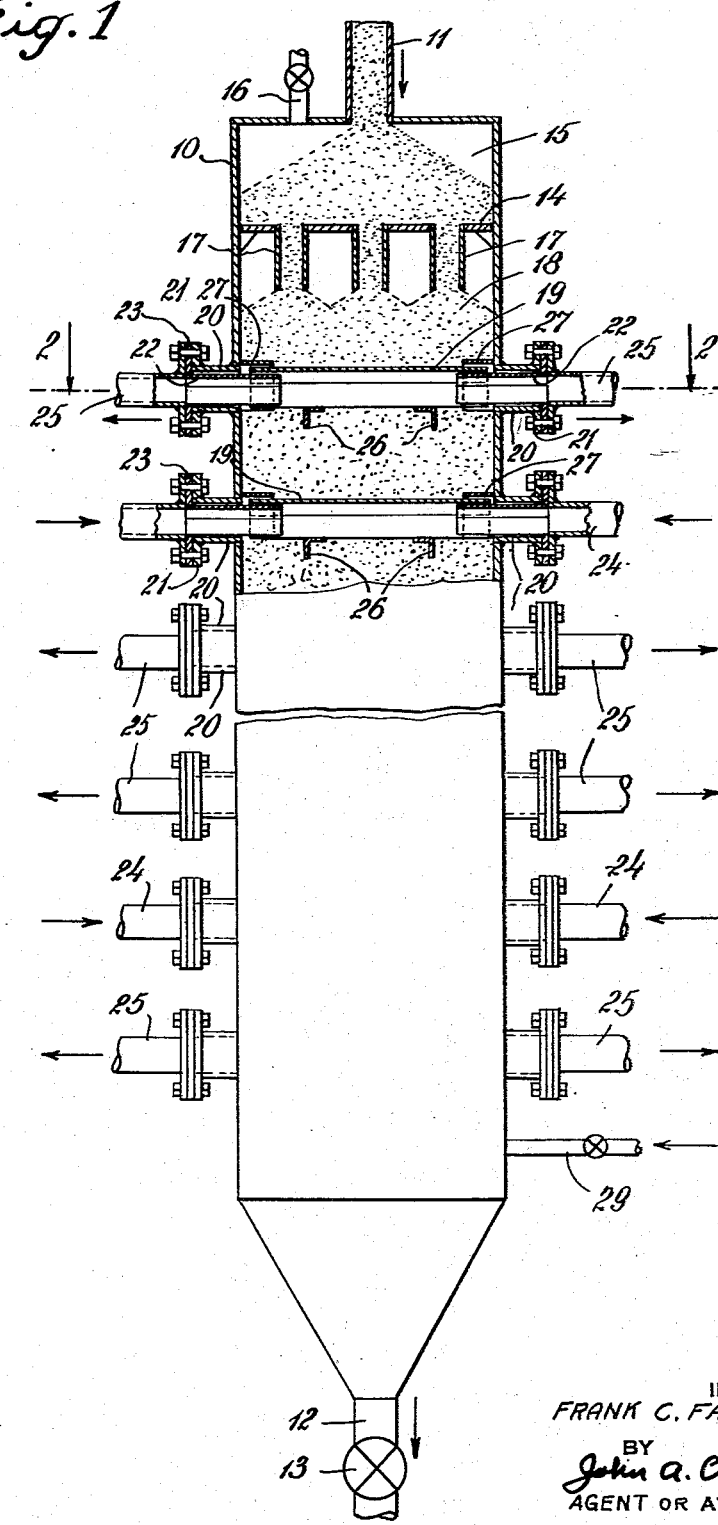

Sept. 12, 1950    F. C. FAHNESTOCK    2,522,354
GAS-SOLID CONTACT APPARATUS
Filed May 22, 1946    2 Sheets-Sheet 1

INVENTOR
FRANK C. FAHNESTOCK
BY
John A. Crowley, Jr.
AGENT OR ATTORNEY

Sept. 12, 1950  F. C. FAHNESTOCK  2,522,354
GAS-SOLID CONTACT APPARATUS
Filed May 22, 1946  2 Sheets-Sheet 2

INVENTOR
FRANK C. FAHNESTOCK
BY
John A. Crowley, Jr.
AGENT OR ATTORNEY

Patented Sept. 12, 1950

2,522,354

UNITED STATES PATENT OFFICE 2,522,354

GAS-SOLID CONTACT APPARATUS

Frank C. Fahnestock, Manhasset, N. Y., assignor to Socony-Vacuum Oil Company, Incorporated, a corporation of New York Application May 22, 1946, Serial No. 671,574

5 Claims. (Cl. 23—288)

This invention has to do with apparatus for contacting gaseous materials with particle form solids for any of a number of purposes. Exemplary of such purposes are gas adsorption, gas purification, gas-solid heat exchange, solid treatment and catalytic conversion operations. Typical of such catalytic conversion operations is the catalytic conversion of hydrocarbons, it being well known that hydrocarbons of gas oil nature boiling between about 450–800° F. may be converted to gasoline and other products by subjecting such gas oil to a particle form solid adsorbent material at temperatures of the order of 800° F. and usually at super-atmospheric pressures. In a recent form this process has been developed as one wherein the contact material is passed cyclically through a reaction zone wherein it flows as a substantially compact column of solid particles while being contacted with hydrocarbons in the gaseous phase to effect the conversion thereof and through a regeneration zone wherein it flows as a substantially compact column of solid particles while being contacted with a combustion supporting gas, such as air acting to burn off of the contact material a carbonaceous contaminant deposited thereon during the hydrocarbon conversion. The contact material may take the form of natural or treated clays, bauxites, alumina, or certain synthetic associations of silica, alumina or silica and alumina to which small percentages of other materials such as metallic oxides may be added for special purposes. The contact material may range in particle size from about 4 to 100 mesh and preferably from about 4 to 30 mesh by Tyler Standard Screen analysis.

This invention has specifically to do with details of construction in connection with reactors and regenerators wherein fluid reactants are brought into contact with a moving compact stream of particle form contact material. Inasmuch as both reactor and regenerator are alike in this fundamental operation, the term reactor will be used hereinafter in the explanation and claiming of the invention in a sense sufficiently broad to include fluid-solid contact apparatus regardless of exact purposes of use.

A major object of this invention is the provision of an improved practical gas handling apparatus whereby fluid reactants may be conducted into or withdrawn from a compact mass of contact material in a contacting vessel without substantial entrainment of said contact material in the gaseous streams. This and other objects of this invention will become apparent from the following discussion thereof.

Figure 3:
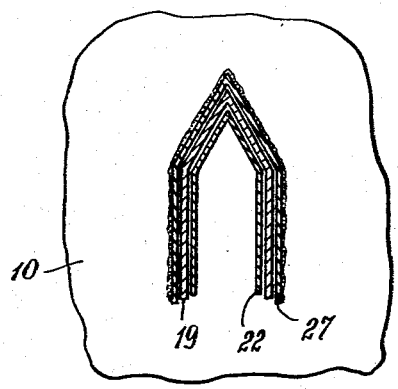
Figure 2:
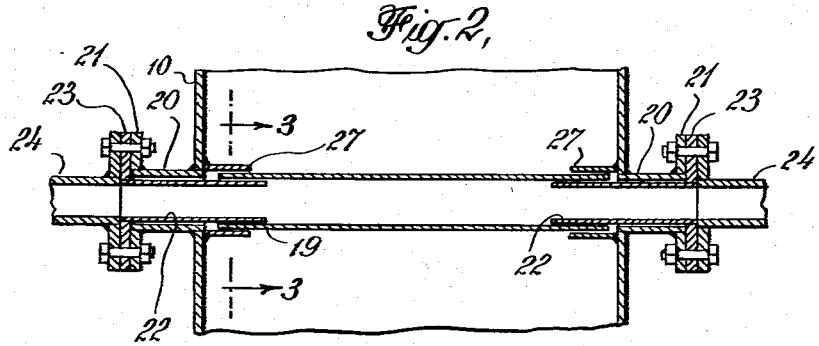
Figure 4:
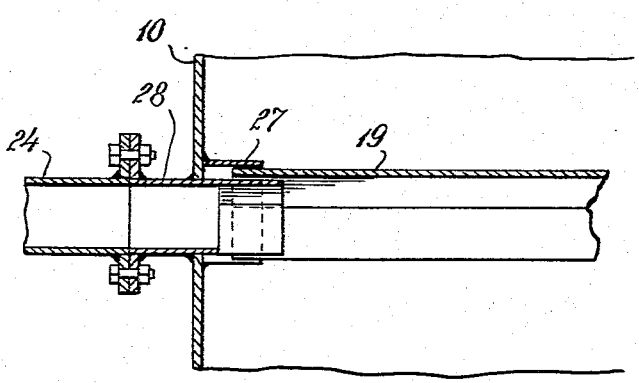

The invention may be more readily understood by reference to the drawings attached hereto of which Figure 1 is an elevational view, partially in section, showing the preferred form of the apparatus of this invention applied to a reaction or regeneration vessel, Figure 2 is a horizontal sectional view showing an enlarged portion of the apparatus taken at line 2—2 of Figure 1, Figure 3 is a sectional view taken at line 3—3 of Figure 2 and Figure 4 is an enlarged sectional view showing in detail a modified form of the invention. All of these drawings are highly diagrammatic in form.

Turning now to Figure 1, there is shown a reactor 10 having a solid inlet conduit 11 at its upper end and a solid outlet conduit 12, bearing a flow control valve 13 at its lower end. Across the upper section of the reactor extends a partition 14 defining a seal and solid surge chamber 15 in the upper end of the reactor. A seal gas inlet 16 is provided for the seal chamber. Uniformly spaced tubes 17 depend from partition 14 for passage of solid material from the seal chamber to the reaction zone 18 therebelow. Inverted trough members 19 are disposed transversely across the interior of the reactor at spaced vertical intervals. These trough members may be of any practical cross-sectional shape, but gable-roofed trough members are preferred. Louvered openings (not shown), may be provided in the side walls of the trough members if desired. Such louvers should be of such shape to permit gas flow therethrough while preventing solid flow. It will be understood that while only one trough member is shown at each level in the vessel of Figure 1, a number of horizontally spaced apart, parallel trough members may be provided in vessels of large cross-sectional area so as to insure uniform distribution and collection of gaseous reactants. Nozzles 20 are connected through the wall of the vessel 10 adjacent opposite ends of each trough member. These nozzles should be of such cross-sectional shape as will accommodate the sleeves to be described hereinafter. When a number of troughs are provided at each level, the nozzle member may, if desired, extend horizontally across a major portion of the width of the vessel wall. A flange 21 may be provided on each of the nozzles 20. Passing through the nozzles 20, is a sleeve 22 which may be rigidly supported by means of flange 23 fitting between the flanged nozzles 20 and the flanged fluid inlet conduit 24 or fluid outlet conduit 25. Each sleeve 22 extends a short distance under one end of a trough member so as to communicate the underside of the trough member with the external fluid inlet or outlet conduit as the case may be. The sleeves may be of any given cross-sectional shape but should preferably be of the same cross-sectional shape as the trough member at least along that portion of the sleeve length which extends under the end of the trough member. With this construction the sleeves 22 not only act as a passage for fluid reactant flow but they may also act as supports for the trough members. This support may be supplemented, if desired, by means of support angles 26 below the trough members.

In operation particle form contact material is admitted through conduit 11 into surge chamber 15 from which it flows through tubes 17 into the reaction zone 18. Contact material is withdrawn from the bottom of the reactor through conduit 12 at a rate controlled by valve 13 so as to maintain the reaction zone substantially filled with a substantially compact column of solid particles. Fluid reactants may be supplied to the inlet conduits 24 from a common manifold, if desired, or from separate feeder pipes. Fluid reactant passes from inlet conduits 24 through sleeves 22 under the trough members 19 at alternate levels. The fluid reactant passes out from under the open bottoms of alternate trough members into the column of contact material, the fluid reactant stream flowing upwardly and downwardly from each distributing trough member to similar collecting trough members adjacent thereabove and therebelow. Fuid reactant passes from the contact material column under said adjacent collecting trough members and is withdrawn therefrom through sleeves 22 and outlet conduits 25. It will be understood that while the above described "split-flow" operation is a preferred form of this invention, it is not limited thereto. The inlets and outlets may be so selected as to provide any desired direction of reactant flow through the contact material column. For example, the levels of fluid inlets and outlets may be so chosen as to provide in the superposed stages, only an upward flow of fluid reactant through the contact material column, the reactant flow in each stage being between independent fluid inlets and outlets. Fluid reactant may be introduced into each end of each distributing trough member and collected from each end of each collecting trough member as shown in Figure 1, or the sleeve on one end of each trough member may be blanked so as to permit gas communication between the interior and only one end of each trough member. When the escape of some reactant fluid from the ends of the vessel is objectionable, seal gas such as flue gas or steam may be introduced through conduit 16 into chamber 15 and through conduit 29 into the vessel 10 below the reaction zone.

While it would appear that the apparatus thus far described would permit proper reactant introduction to and withdrawal from the column of contact material in the reaction zone; it has been found that in actual operation there is a tendency for particles of solid material to flow into the open ends of the inverted troughs through the space between the sleeve and trough wall. This tendency is particularly marked in the case of those troughs used as gas collectors. Moreover, since the trough members are usually constructed of relatively light metal, there is a marked tendency for their side walls to warp somewhat when they are used under high temperature conditions of operation such as occur in hydrocarbon conversion reactors and catalyst regenerators. This warping of the trough members has been found to increase the spacing between the sleeves and trough member walls so that the flow of solid particles into the ends of the trough members is accentuated. This flow of solid particles under the ends of distributor troughs is undesirable because such particles fall into the incoming high velocity stream of reactant-fluid and are thrown about violently by the high velocity gas stream causing breakage and attrition of the solid particles and abrasion of the metal parts of the apparatus. In the case of the collector trough, the solid material slipping under the ends of the troughs falls directly into the high velocity effluent reactant stream and is entrained from the reactor in said stream. While welding of the sleeve side walls to those of the trough would prevent the above difficulties, it would give rise to another, namely serious buckling of the then rigidly held trough member due to thermal expansion and contraction during changes in apparatus temperature. It has been found that all of the above difficulties may be avoided by the provision of metal guards or shields 27 having the same shape as the trough member. These light metal guards are rigidly attached, as by welding, to the wall of the vessel adjacent either end of each trough in such a manner as to fit concentrically over the ends of the troughs and to extend a short distance beyond the ends. To accomplish this, the guard 27 is made slightly longer than the trough member. It will be clear that "concentrically" as used herein in describing and claiming this invention is used in a broad sense of one part slipping closely over another of similar shape, even though the cross-sectional shape of those parts may not be circular.

The arrangement may be more clearly seen in the enlarged sectional view shown in Figure 2 and in the vertical section shown in Figure 3. Like parts in Figures 1, 2 and 3 bear like numerals making Figures 2 and 3 understandable without further description.

A somewhat simple form of the invention is shown in Figure 4 wherein is shown a portion of the wall of a reactor 10, a portion of a trough member 19, an external gas inlet conduit 24 and a connecting member 28 rigidly fastened to the vessel wall and passing therethrough to extend a short distance under the trough member 19. The trough member is of the preferred gable-roofed variety and that portion of the connecting member 28 which extends under the trough member is of the same cross-sectional shape as the trough member and is open on bottom. The portion of the connecting member passing through the vessel and connecting to the conduit 24 is closed on bottom and may be of other cross-sectional shape than the remaining portion. A metal guard 27, welded to the shell slips over the end of the trough.

It has been found that the above apparatus combination prevents solid flow into the ends of gas handling troughs, while at the same time permitting free expansion or contraction of the trough member during periods of temperature change.

It will be understood that the details of construction and examples of application of this invention given hereinabove are intended as illustrative only and are not to be construed as limiting the scope of this invention except as it may be limited by the following claims.

I claim:

1. In a reactor of the type described, a reactant fluid handling structure comprising: an inverted trough member disposed transversely of the interior of the reactor, rigidly supported sleeves passing through the wall of said vessel on opposite ends of said trough member and slideably extending a short distance under each end of said trough member, at least one of said sleeves being adapted to provide fluid communication between said trough members and the space exterior of said reactor, metal guards of approximately the same cross-sectional shape as said trough member rigidly attached to the wall of the shell adjacent opposite ends of said trough member and extending inwardly from the shell wall a short distance beyond the ends of said trough member, so that each guard overlaps a short end section of said trough member.

2. An apparatus according to claim 1 characterized in that said trough member is provided with a gable shaped roof.

3. In a gas-solid contacting vessel a gas handling structure comprising: an inverted trough member extending horizontally across said contacting vessel and terminating short of the vessel wall, a gas handling conduit outside of said vessel and adjacent opposite ends of said trough member, connecting members communicating with said gas handling conduit and passing through the vessel wall adjacent opposite ends of said trough member and extending a short distance under the ends of said trough member so as to communicate the space under said trough member with said gas handling conduit, said connecting members extending under said trough in such a manner as to permit longitudinal movement of the trough with respect to the sleeve, metal shields having a cross-sectional shape similar to that of said trough member attached rigidly to the wall of said vessel adjacent opposite ends of said trough member in such a manner as to fit concentrically over the ends of said trough member and to extend inwardly a short distance beyond said ends.

4. In a catalyst regenerator of the type described, a gas handling structure comprising an inverted, gable-roofed trough extending horizontally across said regenerator and terminating in its ends short of the vessel wall, ducts connected through the vessel wall adjacent the two opposite ends of said trough, a sleeve passing through each of said ducts and supported therefrom and sildeably extending a short distance under an end of said trough, each of said sleeves being of similar cross-sectional shape to that of said trough at least along that portion of the sleeve length extending under said trough, metal shields having cross-sectional shapes similar to that of said trough rigidly attached to the wall of said vessel adjacent opposite ends of said trough in such a manner that each shield fits snugly around the edge of said trough and overlaps by a short distance one end of said trough.

5. In a gas solid contacting vessel of the type described, a gas handling structure comprising in combination: an inverted trough member disposed transversely of the interior of said vessel, sleeves rigidly mounted in and passing through the wall of said vessel adjacent opposite ends of said trough member, each sleeve extending a short distance under one end of said trough member and having a cross-sectional shape along that portion of its length which extends under said trough member similar to the cross-sectional shape of said trough member, each of said sleeves being adapted to permit slippage of the trough member with respect to the sleeve, metal shields having a cross-sectional shape similar to that of said trough member rigidly attached to the wall of said vessel adjacent opposite ends of said trough member in such a manner as to fit concentrically over the ends of said trough member and to extend inwardly of said vessel a short distance beyond the ends of said trough member.

FRANK C. FAHNESTOCK.

REFERENCES CITED

The following references are of record in the file of this patent:

UNITED STATES PATENTS

| Number | Name | Date |
|---|---|---|
| 2,363,623 | Roach et al. | Nov. 28, 1944 |
| 2,417,399 | Simpson et al. | Mar. 11, 1947 |
| 2,434,202 | Evans et al. | Jan. 6, 1948 |